(12) United States Patent
Rovang (10) Patent No.: US 7,546,584 B2
(45) Date of Patent: Jun. 9, 2009

(54) METHOD AND SYSTEM FOR REMOTE SOFTWARE TESTING

(75) Inventor: Gene Rovang, Norcross, GA (US)

(73) Assignee: American Megatrends, Inc., Norcross, GA (US)

( * ) Notice: Subject to any disclaimer, the term of this patent is extended or adjusted under 35 U.S.C. 154(b) by 455 days.

(21) Appl. No.: 10/462,509

(22) Filed: Jun. 16, 2003

(65) Prior Publication Data

US 2004/0255276 A1    Dec. 16, 2004

(51) Int. Cl.
- G06F 19/00    (2006.01)
- G06F 3/00     (2006.01)
- G06F 9/44     (2006.01)
- H04N 7/173    (2006.01)
- G06F 15/167   (2006.01)

(52) U.S. Cl. .................. 717/124; 725/87; 709/208; 709/217; 709/212; 702/122; 715/740

(58) Field of Classification Search .................. 717/124; 725/87; 709/212
See application file for complete search history.

(56) References Cited

U.S. PATENT DOCUMENTS

| | | | | |
|---|---|---|---|---|
| 4,589,068 | A | 5/1986 | Heinen, Jr. | 717/127 |
| 4,979,074 | A | 12/1990 | Morley et al. | 361/720 |
| 5,228,039 | A | 7/1993 | Knoke et al. | 714/28 |
| 5,388,252 | A | 2/1995 | Dreste et al. | |
| 5,455,933 | A | 10/1995 | Schieve et al. | 714/27 |
| 5,491,743 | A | 2/1996 | Shiio et al. | 709/204 |
| 5,615,331 | A | 3/1997 | Toorians et al. | 395/182.07 |
| 5,625,410 | A | 4/1997 | Washino et al. | |
| 5,630,049 | A | 5/1997 | Cardoza et al. | 714/25 |
| 5,732,212 | A | 3/1998 | Perholtz et al. | 709/224 |
| 5,777,874 | A | 7/1998 | Flood et al. | 700/82 |
| 5,815,653 | A | 9/1998 | You et al. | 714/38 |
| 5,819,093 | A | 10/1998 | Davidson et al. | 717/126 |
| 5,850,562 | A | 12/1998 | Crump et al. | 395/800 |

(Continued)

OTHER PUBLICATIONS

"AMIDiag for Windows, User's Guide, (Version 2.0)" Feb. 25, 2002, http://www.ami.com/support/doc/MAN-DIAG-WIN.pdf.*

(Continued)

Primary Examiner—Wei Zhen
Assistant Examiner—Chih-Ching Chow
(74) Attorney, Agent, or Firm—Hope Baldauff Hartman, LLC (57) ABSTRACT

Systems and methods for testing a computer program executing on a remote computer physically distant from a local computer are provided. The local and remote computers are connected via a network. The remote computer includes a redirection device operative to transmit the video output of the remote computer to the local computer via the network connection. The redirection device may also receive user input commands generated at the local computer and provide the input commands to the remote computer as if the input commands were physically generated by a user at the remote computer. The remote computer also includes a software program to be tested. The local computer includes a remote control software application operative to receive and display the video output transmitted from the remote computer. The remote control application also receives user input commands, such as keyboard or mouse commands, generated at the local computer by an automated testing application and transmits the commands to the redirection device. The commands generated by the automated testing program may be utilized to test the execution of the computer program to be tested executing on the remote computer.

17 Claims, 5 Drawing Sheets

U.S. PATENT DOCUMENTS

| | | | | |
|---|---|---|---|---|
| 5,878,158 | A | 3/1999 | Ferris et al. | 382/125 |
| 5,953,451 | A | 9/1999 | Syeda-Mahmood | 382/187 |
| 5,990,852 | A | 11/1999 | Szamrej | 345/2.1 |
| 6,011,920 | A | 1/2000 | Edwards et al. | 717/130 |
| 6,035,059 | A | 3/2000 | Kurosawa et al. | 382/164 |
| 6,054,676 | A | 4/2000 | Wall et al. | 219/209 |
| 6,055,334 | A | 4/2000 | Kato | 382/190 |
| 6,065,072 | A | 5/2000 | Flath | 710/29 |
| 6,115,645 | A * | 9/2000 | Berar | 700/121 |
| 6,119,247 | A | 9/2000 | House et al. | 714/38 |
| 6,124,811 | A | 9/2000 | Acharya et al. | 341/63 |
| 6,137,455 | A | 10/2000 | Duo | 345/520 |
| 6,145,088 | A | 11/2000 | Stevens | 714/2 |
| 6,170,021 | B1 | 1/2001 | Graf | 710/15 |
| 6,202,070 | B1 * | 3/2001 | Nguyen et al. | 707/104.1 |
| 6,209,023 | B1 | 3/2001 | Dimitroff et al. | |
| 6,219,695 | B1 | 4/2001 | Guttag et al. | 709/217 |
| 6,236,884 | B1 * | 5/2001 | Hunter et al. | 600/544 |
| 6,243,743 | B1 | 6/2001 | Freeny | 709/217 |
| 6,263,373 | B1 | 7/2001 | Cromer et al. | 709/250 |
| 6,272,562 | B1 | 8/2001 | Scott et al. | 710/16 |
| 6,288,753 | B1 * | 9/2001 | DeNicola et al. | 348/586 |
| 6,304,895 | B1 | 10/2001 | Schneider et al. | 709/203 |
| 6,330,167 | B1 | 12/2001 | Kobayashi | 361/818 |
| 6,360,250 | B1 | 3/2002 | Anupam et al. | 709/204 |
| 6,377,461 | B1 | 4/2002 | Ozmat et al. | 361/704 |
| 6,378,014 | B1 | 4/2002 | Shirley | 710/100 |
| 6,397,256 | B1 | 5/2002 | Chan et al. | 709/229 |
| 6,414,716 | B1 | 7/2002 | Kawai | 348/211 |
| 6,434,003 | B1 | 8/2002 | Roy et al. | 361/699 |
| 6,476,854 | B1 | 11/2002 | Emerson et al. | 348/143 |
| 6,552,914 | B1 | 4/2003 | Chang | |
| 6,560,641 | B1 | 5/2003 | Powderly et al. | 709/219 |
| 6,601,119 | B1 | 7/2003 | Slutz et al. | |
| 6,603,665 | B1 | 8/2003 | Truong et al. | 361/752 |
| 6,609,034 | B1 | 8/2003 | Behrens et al. | 700/19 |
| 6,636,929 | B1 | 10/2003 | Frantz et al. | 710/313 |
| 6,636,982 | B1 | 10/2003 | Rowlands | |
| 6,651,120 | B2 | 11/2003 | Chiba et al. | 710/65 |
| 6,651,190 | B1 | 11/2003 | Worley et al. | 714/43 |
| 6,662,217 | B1 | 12/2003 | Godfrey et al. | |
| 6,664,969 | B1 | 12/2003 | Emerson et al. | 345/544 |
| 6,681,250 | B1 | 1/2004 | Thomas et al. | 709/226 |
| 6,754,891 | B1 | 6/2004 | Snyder et al. | 717/128 |
| 6,816,963 | B1 | 11/2004 | Krithivas et al. | |
| 6,820,267 | B2 | 11/2004 | Christensen et al. | |
| 6,825,846 | B2 * | 11/2004 | Mondal | 345/547 |
| 6,894,906 | B2 | 5/2005 | Sivertsen | 361/796 |
| 6,907,519 | B2 | 6/2005 | Desoli | |
| 6,959,380 | B2 * | 10/2005 | Dake et al. | 713/2 |
| 6,963,425 | B1 | 11/2005 | Nair et al. | 358/1.9 |
| 6,993,747 | B1 * | 1/2006 | Friedman | 717/124 |
| 7,039,229 | B2 | 5/2006 | Lin et al. | 382/165 |
| 7,165,041 | B1 * | 1/2007 | Guheen et al. | 705/26 |
| 7,181,510 | B2 | 2/2007 | Emerson et al. | |
| 7,209,874 | B2 | 4/2007 | Salmonsen | |
| 7,231,606 | B2 | 6/2007 | Miller et al. | |
| 7,233,336 | B2 | 6/2007 | Mondal | 345/547 |
| 7,260,624 | B2 | 8/2007 | Sivertsen et al. | 709/223 |
| 7,299,463 | B2 | 11/2007 | Brannock et al. | |
| 7,454,490 | B2 * | 11/2008 | Sivertsen | 709/223 |
| 2001/0027465 | A1 | 10/2001 | Hammelbacher | |
| 2001/0037366 | A1 | 11/2001 | Web et al. | 709/204 |
| 2002/0040418 | A1 | 4/2002 | Bress et al. | 711/112 |
| 2002/0078188 | A1 | 6/2002 | Anand et al. | |
| 2002/0083156 | A1 | 6/2002 | Wysoczynski | |
| 2002/0087949 | A1 * | 7/2002 | Golender et al. | 717/124 |
| 2002/0097234 | A1 | 7/2002 | Sauber | 345/204 |
| 2002/0103882 | A1 * | 8/2002 | Johnston et al. | 709/218 |
| 2002/0174415 | A1 | 11/2002 | Hines | 717/127 |
| 2002/0178320 | A1 | 11/2002 | Wu | |
| 2002/0194403 | A1 | 12/2002 | Pua et al. | 710/62 |
| 2002/0199035 | A1 | 12/2002 | Christensen et al. | |
| 2003/0023435 | A1 * | 1/2003 | Josephson | 704/235 |
| 2003/0035049 | A1 | 2/2003 | Dickens et al. | 348/100 |
| 2003/0058248 | A1 | 3/2003 | Hockmuth et al. | 345/537 |
| 2003/0083842 | A1 * | 5/2003 | Miller et al. | 702/122 |
| 2003/0110244 | A1 | 6/2003 | Mondal | 709/223 |
| 2003/0156132 | A1 * | 8/2003 | Gn et al. | 345/740 |
| 2003/0177111 | A1 | 9/2003 | Egendorf et al. | 707/3 |
| 2003/0200273 | A1 * | 10/2003 | Khanna et al. | 709/208 |
| 2003/0226015 | A1 | 12/2003 | Neufeld et al. | |
| 2004/0054838 | A1 | 3/2004 | Hoese et al. | |
| 2004/0059782 | A1 | 3/2004 | Sivertsen | |
| 2004/0158614 | A1 | 8/2004 | Williams | 709/207 |
| 2004/0190773 | A1 | 9/2004 | Messer et al. | 382/182 |
| 2004/0199699 | A1 | 10/2004 | Bobbitt et al. | |
| 2004/0215617 | A1 | 10/2004 | Ramsey et al. | |
| 2004/0243883 | A1 | 12/2004 | Shankar et al. | |
| 2005/0021654 | A1 | 1/2005 | Kern et al. | |
| 2005/0044244 | A1 | 2/2005 | Warwick et al. | |
| 2005/0066000 | A1 | 3/2005 | Liaw et al. | |
| 2005/0086670 | A1 | 4/2005 | Christensen et al. | |
| 2006/0189900 | A1 | 8/2006 | Flaherty | |
| 2006/0195042 | A1 | 8/2006 | Flaherty | |
| 2007/0168746 | A1 | 7/2007 | Righi et al. | |

OTHER PUBLICATIONS

U.S. Appl. No. 10/867,406, filed Jun. 14, 2004, entitled "In-Line Video, Keyboard and Mouse Remote Management Unit." Inventor: Clas Gerhard Sivertsen.
U.S. Official Action dated Aug. 13, 2003 in U.S. Appl. No. 10/016,484.
U.S. Official Action dated Mar. 8, 2004 in U.S. Appl. No. 10/016,484.
U.S. Official Action dated Jun. 22, 2004 in U.S. Appl. No. 10/016,484.
U.S. Official Action dated Apr. 18, 2006 in U.S. Appl. No. 10/966,221.
U.S. Official Action dated Sep. 5, 2006 in U.S. Appl. No. 10/966,221.
U.S. Official Action dated Feb. 23, 2004 in U.S. Appl. No. 10/247,876.
U.S. Official Action dated Aug. 3, 2004 in U.S. Appl. No. 10/247,876.
U.S. Official Action dated Feb. 3, 2005 in U.S. Appl. No. 10/247,876.
U.S. Official Action dated Aug. 8, 2005 in U.S. Appl. No. 10/247,876.
U.S. Official Action dated Feb. 24, 2006 in U.S. Appl. No. 10/247,876.
U.S. Official Action dated Aug. 17, 2006 in U.S. Appl. No. 10/247,876.
U.S. Official Action dated Feb. 27, 2007 in U.S. Appl. No. 10/867,406.
U.S. Official Action dated Aug. 10, 2007 in U.S. Appl. No. 10/867,406.
U.S. Official Action dated Jan. 24, 2006 in U.S. Appl. No. 10/446,044.
U.S. Official Action dated Jul. 14, 2006 in U.S. Appl. No. 10/446,044.
U.S. Official Action dated Oct. 5, 2006 in U.S. Appl. No. 10/446,044.
U.S. Official Action dated Apr. 5, 2007 in U.S. Appl. No. 10/446,044.
U.S. Official Action dated Sep. 19, 2006 in U.S. Appl. No. 10/403,198.
U.S. Official Action dated Mar. 6, 2007 in U.S. Appl. No. 10/403,198.
U.S. Notice of Allowance and Allowability dated Jul. 15, 2004 in U.S. Appl. No. 10/016,484.
U.S. Notice of Allowance and Allowability dated Jan. 5, 2007 in U.S. Appl. No. 10/966,221.
U.S. Notice of Allowance and Allowability dated Apr. 11, 2007 in U.S. Appl. No. 10/247,876.
U.S. Notice of Allowance and Allowability dated Nov. 10, 2004 in U.S. Appl. No. 10/867,348.
U.S. Notice of Allowance and Allowability dated May 31, 2007 in U.S. Appl. No. 10/403,198.
"Z-Series Information Page" printout from Raritan website found at www.Raritan.com/products/kvm_switches/z_series/prd_line.aspx. Printed Feb. 10, 2006.

"New KVM Switching System Controls 2,048 Servers Using Cat5 Cable" printout from Raritan website found at http://www.raritan.com//about/abt_press_detail.aspx?&status=4&articleId=127, printed May 23, 2006.

Raritan Computer, Inc., "Raritan Announces New Paragon CIMs with Innovative DirectConnect Technology," a press release, Jan. 14, 2002, printed from www.raritan.com on Jan. 27, 2005.

U.S. Official Action dated Sep. 18, 2007 in U.S. Appl. No. 10/446,044.

U.S. Appl. No. 10/790,160, filed Mar. 1, 2004, entitled "Method, System, and Apparatus for Communicating with a Computer Management Device" Inventor: Subash Kalbarge.

U.S. Appl. No. 10/926,241, filed Aug. 25, 2004, entitled "Apparatus, Methods, and Systems for Redirecting Input and Output for Multiple Computers" Inventor: Clas G. Sivertsen.

U.S. Appl. No. 10/875,641, filed Jun. 24, 2004, entitled "Method and System for Remote Software Debugging" Inventor: Stefano Righi.

U.S. Official Action dated Jul. 27, 2007 in U.S. Appl. No. 10/875,641.

American Megatrends AMIDebug User's Guide (Version 2.0), 2002.

U.S. Official Action dated Dec. 17, 2007, in U.S. Appl. No. 10/790,160.

U.S. Official Action dated Dec. 27, 2007, in U.S. Appl. No. 10/867,406.

U.S. Official Action dated Jan. 8, 2008, in U.S. Appl. No. 10/446,044.

U.S. Official Action dated Jan. 10, 2008 in U.S. Appl. No. 10/875,641.

U.S. Notice of Allowance and Allowability dated Sep. 18, 2007 in Ser. No. 10/403,198.

U.S. Notice of Allowance and Allowability dated Jan. 11, 2008 in Ser. No. 10/403,198.

"Cable Allows Users to Extend DVI Connections," Jul. 31, 2001, *The Mac Observer*, printed from http://www.macobserver.com/article/2001/07/31.11.shtml, 4 pages.

U.S. Notice of Allowance / Allowability dated May 13, 2008 in U.S. Appl. No. 10/403,198.

U.S. Official Action dated Jun. 3, 2008 in U.S. Appl. No. 10/875,641.

U.S. Notice of Allowance / Allowability dated Jun. 9, 2008 in U.S. Appl. No. 10/446,044.

U.S. Official Action dated Jun. 25, 2008 in U.S. Appl. No. 10/790,160.

American Megatrends, Inc., AMIBIOS8, Introduction to AMIBIOS8™: Overview of Key Features in the Latest AMIBIOS®, Version 1.20, Mar. 25, 2002, 22 pages.

American Megatrends, Inc., AMI Debug Source Level Modular Software Debugger, Data Sheet, Dec. 14, 2004, 2 pages.

AVIT Research, Ltyd., I$^2$C Bus Tool, printed from www.avitresearch.co.uk/ on Aug. 29, 2005, 4 pages.

Calibre, "UCA93LV: USB—I$^2$C Communications Adapter for PCs" Jan. 28, 2005, 2 pages.

Saelig Online Store, UCA93LV, printed from www.saelig.com on Aug. 29, 2005, 2 pages.

* cited by examiner

METHOD AND SYSTEM FOR REMOTE SOFTWARE TESTING

TECHNICAL FIELD

Embodiments of the invention relate generally to the field of software testing. More particularly, embodiments of the invention relate to the field of remote automated software testing.

BACKGROUND OF THE INVENTION

One of the most important parts of the software development process is the process of software testing. Testing refers to the process of repetitively executing portions of a computer program to ensure that the program is functioning correctly and to identify errors within the executing program code. Testing is often performed by a human user of the computer. However, because the testing process can be very repetitive, and therefore stressful on humans, automated testing programs have been developed that simulate human user input to a computer program. In particular, scripts can be generated for use with an automated testing program that simulate user input to the program to be tested in a particular order. For instance, a script may contain instructions for entering keystrokes, mouse movement and selection, and other types of user input commands. In order to thoroughly test a computer program, such scripts can be executed repetitively by the automated testing program on the program to be tested.

Traditionally, an automated testing program must be run directly on the computer system that is executing the software that is being tested. This, however, greatly hinders the software testing process because the user performing the testing must be in close proximity to the system being tested. This may be extremely inconvenient when it is necessary to test the software components of a computer system that is located across the country or even the world.

It is with respect to these considerations and others that the various embodiments of the present invention have been made.

SUMMARY OF THE INVENTION

In accordance with the present invention, the above and other problems are solved by methods and systems for remotely testing a software program. These systems and methods make use of one or more operating system independent video and input/output redirection devices that allow remote control of the computer system from any network-connected location. By using such redirection devices in conjunction with an automated testing program, software components may be tested from virtually anywhere in the world.

In accordance with other aspects, the present invention relates to a system for testing a computer program executing on a computer (the "remote computer") located remotely from another computer (the "local computer"). The remote computer is connected to a network, such as a local area network ("LAN") or the Internet, and includes an operating system independent video and input/output redirection device (referred to herein as a "redirection device"). The redirection device is operative to transmit the video output of the remote computer to the local computer via the network connection.

The redirection device can also receive user input commands provided at the local computer and provide the input commands to the remote computer as if the input commands were physically generated by a user at the remote computer. In this manner, a user of the local computer, or an automated testing program executing on the remote computer, can control the operation of the remote computer from a remote location, regardless of the type of operating system utilized by the remote computer.

The remote computer also includes a software program to be tested, such as an operating system program, a basic input/output system ("BIOS") program, or an application program. The local computer includes a remote control software application, such as a plug-in executing within a World Wide Web ("Web") browser, operative to receive and display the video output transmitted from the remote computer. The remote control application also receives user input commands, such as keyboard or mouse commands, received at the local computer and transmits the commands to the redirection device. The local computer also includes an automated testing program operative to generate a sequence of user input commands for testing the computer program. The output of the automated testing program may be directed toward the display provided by the remote control application and, subsequently, to the computer program executing on the remote computer. In this manner, the automated testing program, in conjunction with the remote control application and the redirection device, may be utilized to execute commands on the computer program to be tested executing on the remote computer.

In accordance with other aspects, the invention relates to a method for testing a computer program executing on a remote computer from a local computer. According to the method, the remote computer executes a computer program to be tested. The video output of the remote computer, including the screen display generated by the computer program to be tested, is transmitted to the remote computer. The video output of the remote computer, including the screen display generated by the program to be tested, is then displayed at the local computer.

User input commands may be generated at the local computer by an automated testing program and directed to the screen display generated by the computer program to be tested. The user input commands are then transmitted from the local computer to the remote computer and executed at the remote computer to control the operation of the computer program to be tested. The user input commands are executed at the remote computer as if the commands were physically generated at the remote computer by one or more input devices physically connected to the remote computer.

Aspects of the invention may be implemented as a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION

As described briefly above, embodiments of the present invention provide methods and systems for remotely testing a computer software program. In the following detailed description, references are made to the accompanying drawings that form a part hereof, and in which are shown by way of illustration specific embodiments or examples. These embodiments may be combined, other embodiments may be utilized, and structural changes may be made without departing from the spirit and scope of the present invention. The following detailed description is, therefore, not be taken in a limiting sense, and the scope of the present invention is defined by the appended claims and their equivalents.

Figure 1:
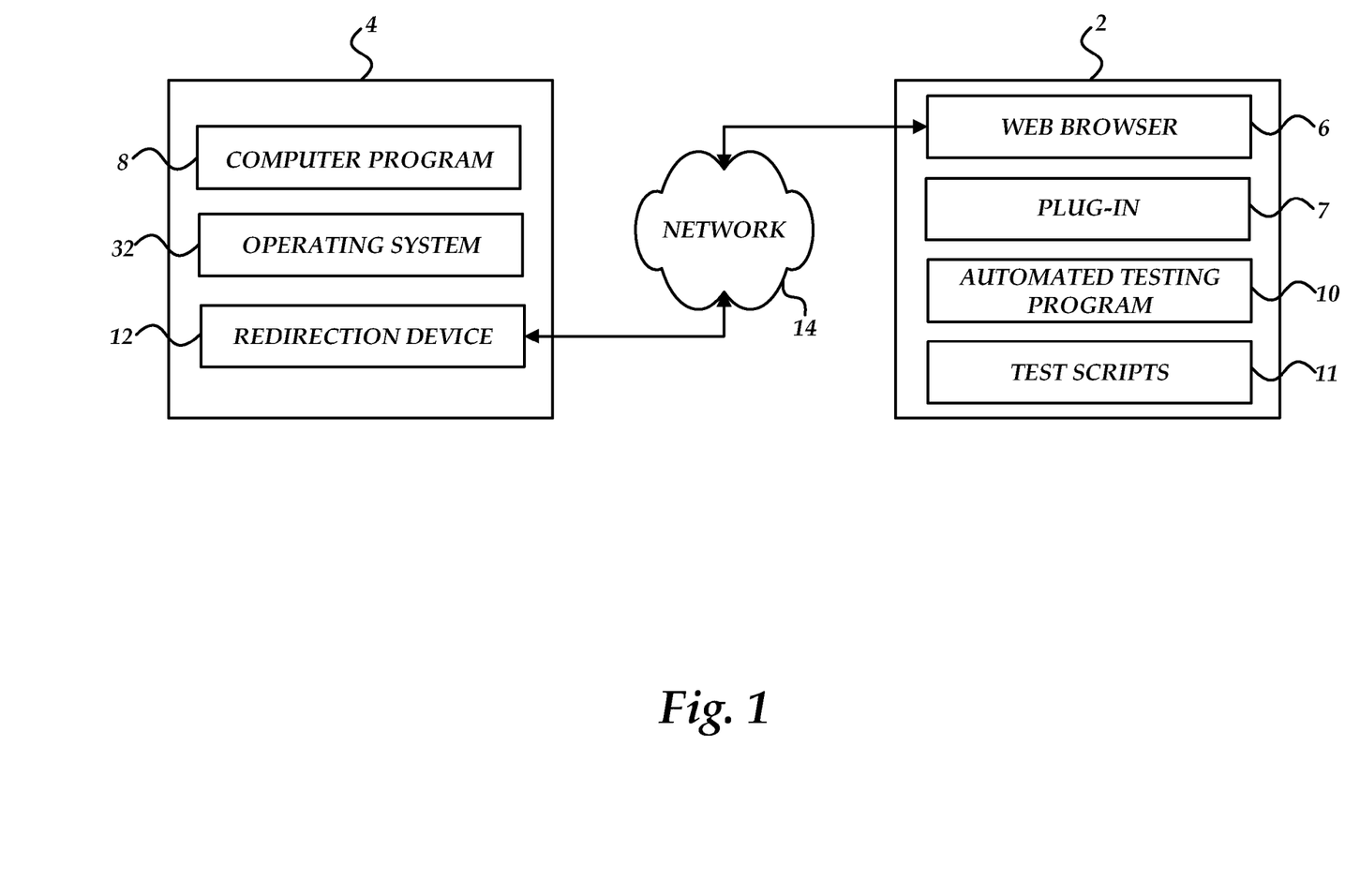
FIG. 1 illustrates a system for remotely testing a computer program provided in one embodiment of the invention.
Figure 2:
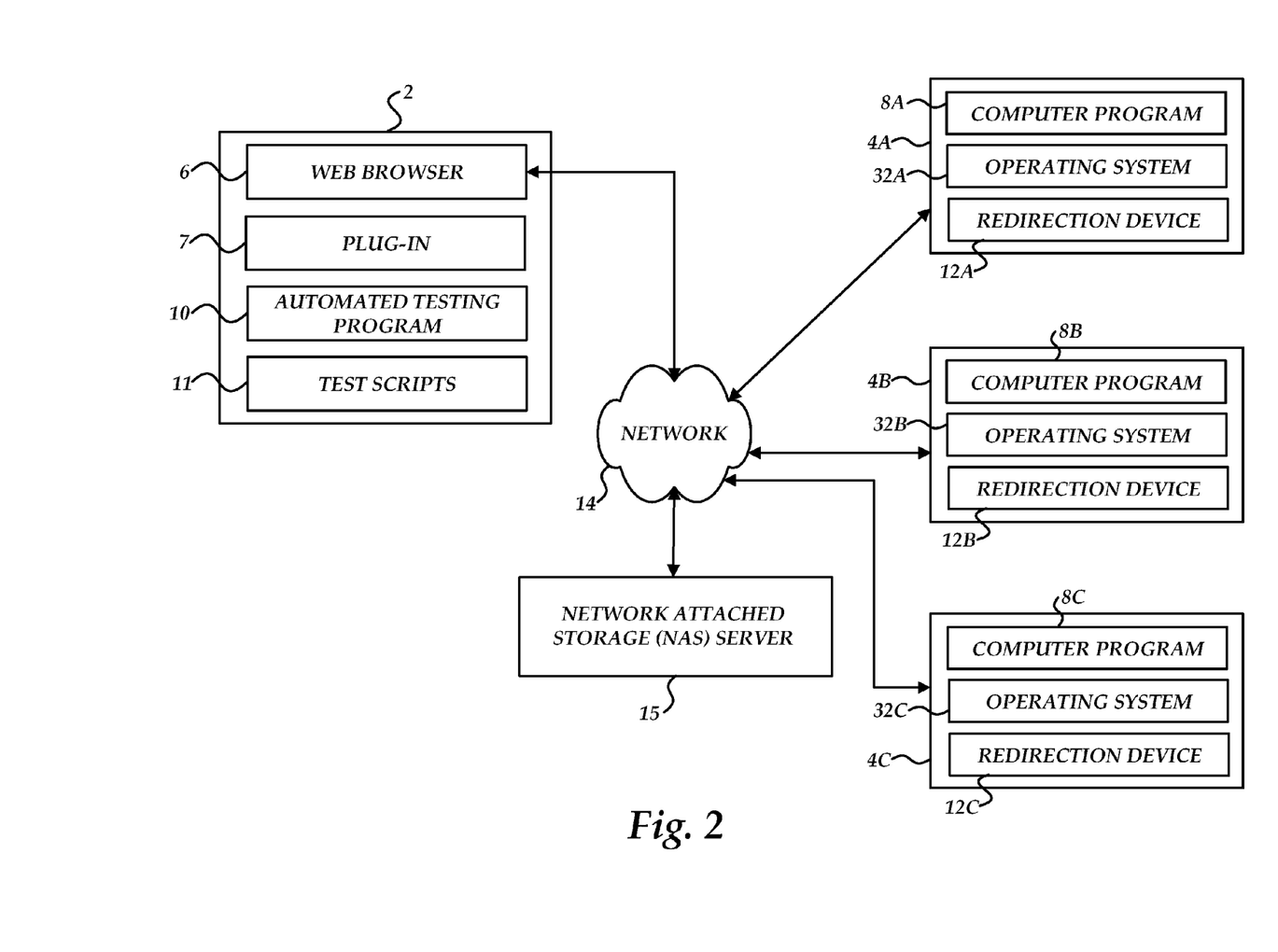
FIG. 2 shows a system for remotely testing a computer program provided in another embodiment of the invention.

Referring now to the drawings, in which like numerals represent like elements through the several figures, aspects of the present invention and the exemplary operating environment will be described. FIGS. 1-2 and the following discussion are intended to provide a brief, general description of a suitable computing environment in which the embodiments of the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, a system for remotely testing a computer program provided in one embodiment of the invention will be described. As shown in FIG. 1, the system includes a local computer 2. The local computer 2 comprises a standard personal or server computer operative to execute a Web browser application program 6, such as the INTERNET EXPLORER browser from MICROSOFT CORPORATION of Redmond, Wash. Alternatively, the local computer 2 may comprise another type of computing device operative to access a network 14, such as a personal digital assistant or other type of computer. The local computer 2 is also connected to a network 14, such as a LAN or the Internet. It should be appreciated, however, that the local computer 2 may be configured for communication over other types of distributed computing networks.

The local computer 2 also includes a plug-in 7 for use in conjunction with the Web browser 6. As known to those skilled in the art, plug-ins may be created utilizing ACTIVEX technology from MICROSOFT CORPORATION, JAVA from SUN MICROSYSTEMS, or other similar technologies from other vendors, that allow special functions to be performed within a Web browser. In particular, the plug-in 7 executes in conjunction with the Web browser 6 and communicates with a redirection device 12 operating in conjunction with a remote computer 4. As will be described in greater detail below, the plug-in 7 receives screen displays from the redirection device 12 and displays them at the local computer 2. The plug-in 7 also receives user input commands, such as mouse or keyboard commands, from an automated testing program 10 executing on the local computer 2 and transmits these commands to the redirection device 12. The redirection device 12 may then provide the commands to remote computer 4, where they may be executed on the remote computer 4 as if they were physically received via an input device connected directly to the remote computer 4.

The automated testing program 10 comprises an application program for testing the functionality of programs executing on a computer system. In particular, the automated testing program 10 allows the creating of test scripts 11 that define a sequence of user interface commands that should be executed on the computer. When the test scripts are executed by the automated testing program 10, the input commands are executed on the computer as if the commands were generated by a user physically utilizing the computer. For instance, keystrokes, mouse movements, mouse clicks, and other types of user interface commands may be generated. As will be discussed in greater detail below, the user interface commands generated by the automated testing program 10 may be applied to a user interface window displayed at the local computer by the plug-in 7 and including a screen display generated by the computer program 8 executing on the remote computer 4. One example of an automated testing program 10 is the WINRUNNER automated testing program provided by MERCURY INTERACTIVE, INC., of Sunnyvale, Calif. It should be appreciated that other types of automated testing programs may be similarly utilized.

The remote computer 4 also comprises a standard desktop or server computer system. The remote computer 4 is connected to the network 14 and is operative to execute a computer program 8 to be tested. The computer program 8 to be tested may comprise an operating system 32 program, a BIOS, an application program, or any other type of program capable of being executed on the remote computer 4.

The remote computer 4 also supports the use of an operating system independent video and input/output redirection device (referred to herein as a "redirection device"). The redirection device receives the video output of the remote computer 4 and compresses the video output for transmission to the plug-in 7 executing on the local computer 2. The redirection device then transmits the compressed video output of the remote computer 4 to the plug-in 7 executing on the local computer 2 via the network connection. The plug-in 7 is operative to decompress the data stream and to display the video output of the remote computer 4 on the local computer 2. The displayed output may include screen displays generated by the computer program 8 or the operating system 32.

The plug-in 7 is also operative to receive user input commands, such as mouse or keyboard commands, generated at the local computer 2 either by a user or by the automated testing program 10 and to transmit the commands to the redirection device 12. The redirection device 12 can receive the user input commands from the plug-in 7 and provide the input commands to the remote computer 4 as if the input commands were physically generated by a user at the remote computer 4. In order to provide this functionality, the redirection device 12 may be physically and electrically connected to the input ports of the remote computer 4 (serial, Universal Serial Bus ("USB"), etc.). The redirection device 12 may also provide connections for user input devices located at the remote computer 4 and may pass through signals received at the user input devices to the remote computer 4. In this manner, user input commands generated by a user physically located at the remote computer 4 may be passed through to the remote computer 4.

Moreover, through the use of the plug-in 7 and the redirection device 12, a user of the local computer 2 can control the operation of the remote computer 4 from a remote location. In particular, a user of the local computer 2 can utilize the output of the automated testing program 10 to test the execution of the computer program 8. According to one embodiment of the invention, the computer program 8 comprises a basic input/output system ("BIOS") utilized by the remote computer 4. However, the computer program 8 may comprise other types of computer programs, such as operating system programs, application programs, device drivers, and others.

It should be appreciated that the redirection device may comprise a device located internal to the remote computer 4 or an external device connected to the external connections of the remote computer 4. One example of an external redirection device comprises an external device that may be connected to the external video output of the remote computer 4, to the network 14, and to the user input devices located at the remote computer 4. Such a device is described in U.S. Pat. No. 7,260,624, entitled "Systems and Methods for Establishing Interaction Between A Local Computer and a Remote Computer", which is assigned to the assignee of the instant patent application and expressly incorporated herein.

Another embodiment may comprise a redirection device that is integrated with the main system board of the remote computer 4 or contained on an adapter card located within the remote computer 4. Such a device is described in U.S. Pat. No. 6,825,846, entitled "Systems and Methods for Capturing Screen Displays From A Host Computing System for Display At A Remote Terminal", which is also assigned to the assignee of the instant patent application and expressly incorporated herein. It should be appreciated that other types of redirection devices may also be utilized.

Referring now to FIG. 2, a system for remotely testing a computer program provided in another actual embodiment of the invention will be described. As shown in FIG. 2, the system includes a local computer 2 and three remote computers 4A, 4B, and 4C. As with the system described above, the local computer 2 comprises a standard personal or server computer operative to execute a Web browser application program 6 and a plug-in 7. The local computer 2 is also connected to a network 14, such as a LAN or the Internet, and may be configured for communication over other types of distributed computing networks.

The local computer 2 also includes a plug-in 7 for use in conjunction with the Web browser 6. In particular, the plug-in 7 executes in conjunction with the Web browser 6 and communicates with a redirection device 12A operating in conjunction with a remote computer 4A. As in the system described above, the plug-in 7 receives screen displays from the redirection device 12A and displays them at the local computer 2. The plug-in 7 also receives user input commands, such as mouse or keyboard commands, from a user of the local computer 2 or an automated testing program 10 and transmits these commands to the redirection device 12A. The redirection device 12A may then provide the commands to remote computer 4A, where they may be executed on the remote computer 4A as if they were physically received via an input device connected directly to the remote computer 4A. Multiple instances of the Web browser 6 and the plug-in 7 may be utilized on the local computer 2 to communicate with other redirection devices, such as the redirection device 12B utilized by the remote computer 4B and the redirection device 12C utilized by the remote computer 4C.

The remote computers 4A, 4B, and 4C also comprise standard desktop or server computer systems. The remote computer 4A is connected to the network 14 and is operative to execute a computer program 8A. As described briefly above, the automated testing program 10, in conjunction with the plug-in 7, the Web browser 6, and the redirection device 12A, may be utilized to test the operation of the computer program 8A. In particular, according to one embodiment, the computer program 8A is operative to access one or more storage volumes maintained by the network attached storage ("NAS") server 15. Alternatively, the automated testing program 10 may control aspects of the operating system 32A for accessing the storage volume maintained by the NAS server 15. Because the redirection devices 12A, 12B, and 12C are operating system independent, different types of operating systems may be utilized to access the storage volumes maintained by the NAS server 15. Comprehensive tests may therefore be automated and performed to test the interaction of the NAS server 15 with computers, such as the remote computers 4A, 4B, and 4C, executing different types of operating systems. It should be appreciated that other types of server computers other than a NAS server 15 may be utilized to provide data storage volumes.

As shown in FIG. 2, the remote computers 4A, 4B, and 4C include redirection devices 12A, 12B, and 12C respectively. As discussed above, the redirection devices 12A, 12B, and 12C, allow a user of the local computer 2 to control the operation of the remote computers 4A, 4B, and 4C from a remote location. In particular, a first instance of the Web browser 6 and the plug-in 7 may be utilized on the local computer 2 to view the screen output of the remote computer 4A, including screen displays generated by the computer program 8A, and to test the execution of the computer program 8A on the remote computer 4A. Another instance of the Web browser 6 and the plug-in 7 may be utilized on the local computer 2 to view the screen output of the remote computer 4B, including screen displays generated by the computer program 8B, and to test the computer program 8B executing on the remote computer 4B. Additionally, yet another instance of the Web browser 6 and the plug-in 7 may be utilized on the local computer 2 to view the screen output of the remote computer 4C, including screen displays generated by the computer program 8C, and to test the computer program 8C executing on the remote computer 4C.

Figure 3:
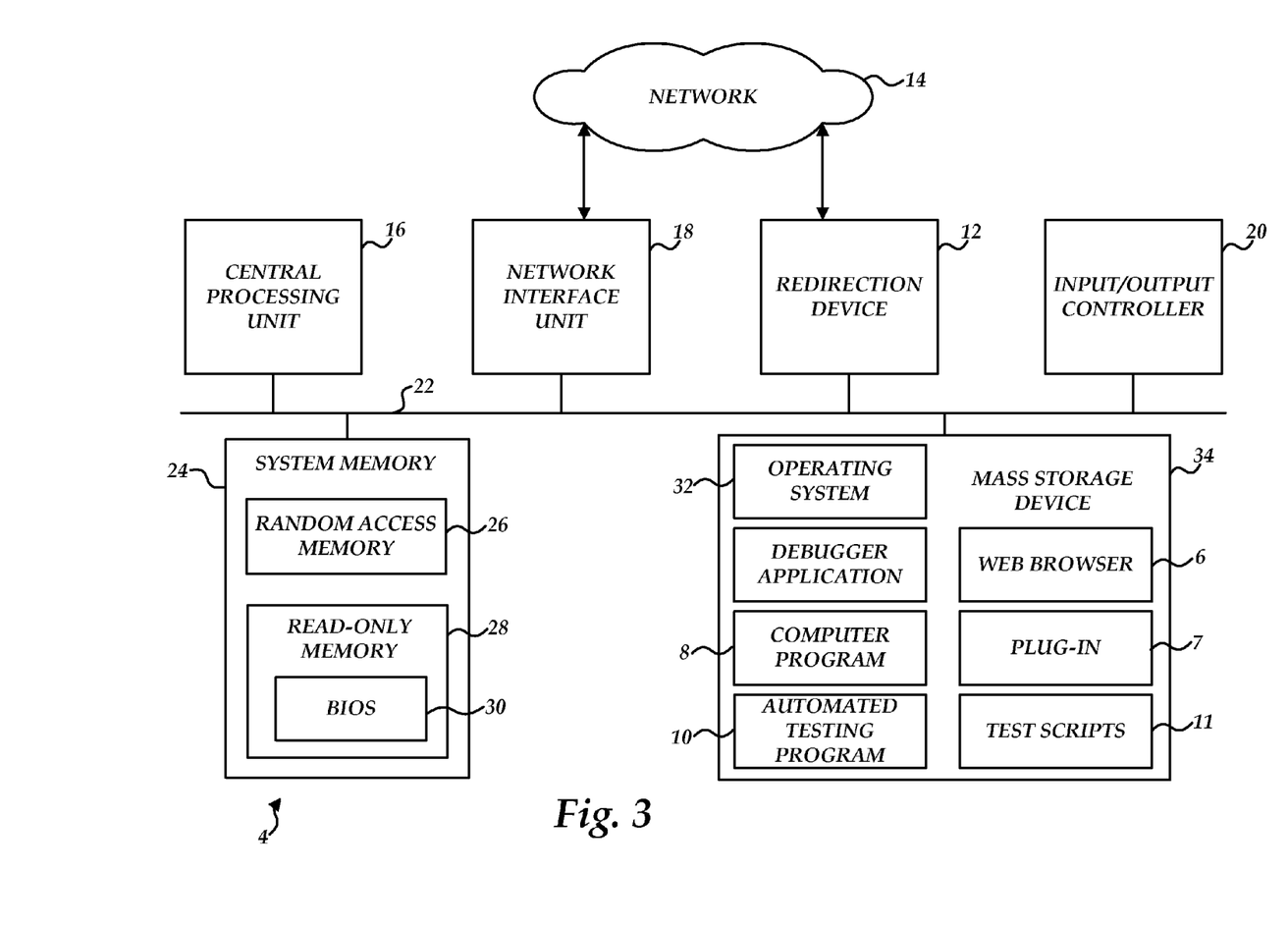
FIG. 3 illustrates a computer architecture for a computer system utilized in the various embodiments of the invention.

Referring now to FIG. 3, an illustrative computer architecture for a computer 4 for practicing the various embodiments of the invention will be described. The computer architecture shown in FIG. 3 illustrates a conventional server or personal computer, including a central processing unit 16 ("CPU"), a system memory 24, including a random access memory 26 ("RAM") and a read-only memory ("ROM") 28, and a system bus 22 that couples the memory to the CPU 16. A basic input/output system 30 containing the basic routines that help to transfer information between elements within the computer, such as during startup, is stored in the ROM 28. The computer 4 further includes a mass storage device 34 for storing an operating system 32 suitable for controlling the operation of a networked computer, such as the WINDOWS NT or XP operating systems from MICROSOFT CORPORATION of Redmond, Wash. The mass storage device 34 also stores application programs, such as the computer program 8, the automated testing program 10, the Web browser 6 and plug-in 7, and data, such as the test scripts 11 used by the automated testing program 10.

The mass storage device 34 is connected to the CPU 16 through a mass storage controller (not shown) connected to the bus 22. The mass storage device 34 and its associated computer-readable media, provide non-volatile storage for the computer 4. Although the description of computer-readable media contained herein refers to a mass storage device, such as a hard disk or CD-ROM drive, it should be appreciated by those skilled in the art that computer-readable media can be any available media that can be accessed by the computer 4.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the computer 4 may operate in a networked environment using logical connections to remote computers through a network 14, such as the Internet or a LAN. The computer 4 may connect to the network 14 through a network interface unit 18 connected to the bus 22. It should be appreciated that the network interface unit 18 may also be utilized to connect to other types of networks and remote computer systems. The computer 4 may also include an input/output controller 20 for receiving and processing input from a number of devices, including a keyboard, mouse, or electronic stylus (not shown in FIG. 3). Similarly, an input/output controller 20 may provide output to a display screen, a printer, or other type of output device.

The computer 4 also includes a redirection device 12. As described above, the redirection device may be internal or external to the computer 4. The redirection device receives and compresses the video output of the computer 4 for transmission over the network 14. The redirection device 12 also transmits the compressed screen displays to a plug-in 7 executing on a remotely located computer, where the data may be decompressed and displayed. Because the redirection device 12 is implemented in hardware, operation of the redirection device 12 is not dependent on the execution of a particular type of operating system 32. Moreover, because the redirection device 12 is implemented in hardware, the operating system 32 does not have to be loaded by the computer 4 for the screen displays of the computer 4 to be compressed and transmitted. In this manner, the computer 4 may be remotely controlled immediately after it is powered on and without the need to load any operating system.

As discussed briefly above, the redirection device also includes input/output ports for connecting peripheral input devices that would otherwise be connected to the computer 4. In particular, a mouse and keyboard (not shown in FIG. 3) may be directly connected to the redirection device 12. Input commands received by these devices may then be passed by the redirection device 12 to the input/output controller 20. Additionally, user input commands may also be received by the plug-in 7 at a remote computer. These commands may be generated by a user or by an automated testing program 10 and are transmitted by the plug-in 7 to the redirection device 12. The remotely generated commands are also passed from the redirection device 12 to the input/output controller 20 for execution on the computer 4 as if the commands were generated locally. In this manner, the operation of the computer 4 and, in particular, the operation of the computer program 8, may be completely controlled from a remote computer.

Figure 4:
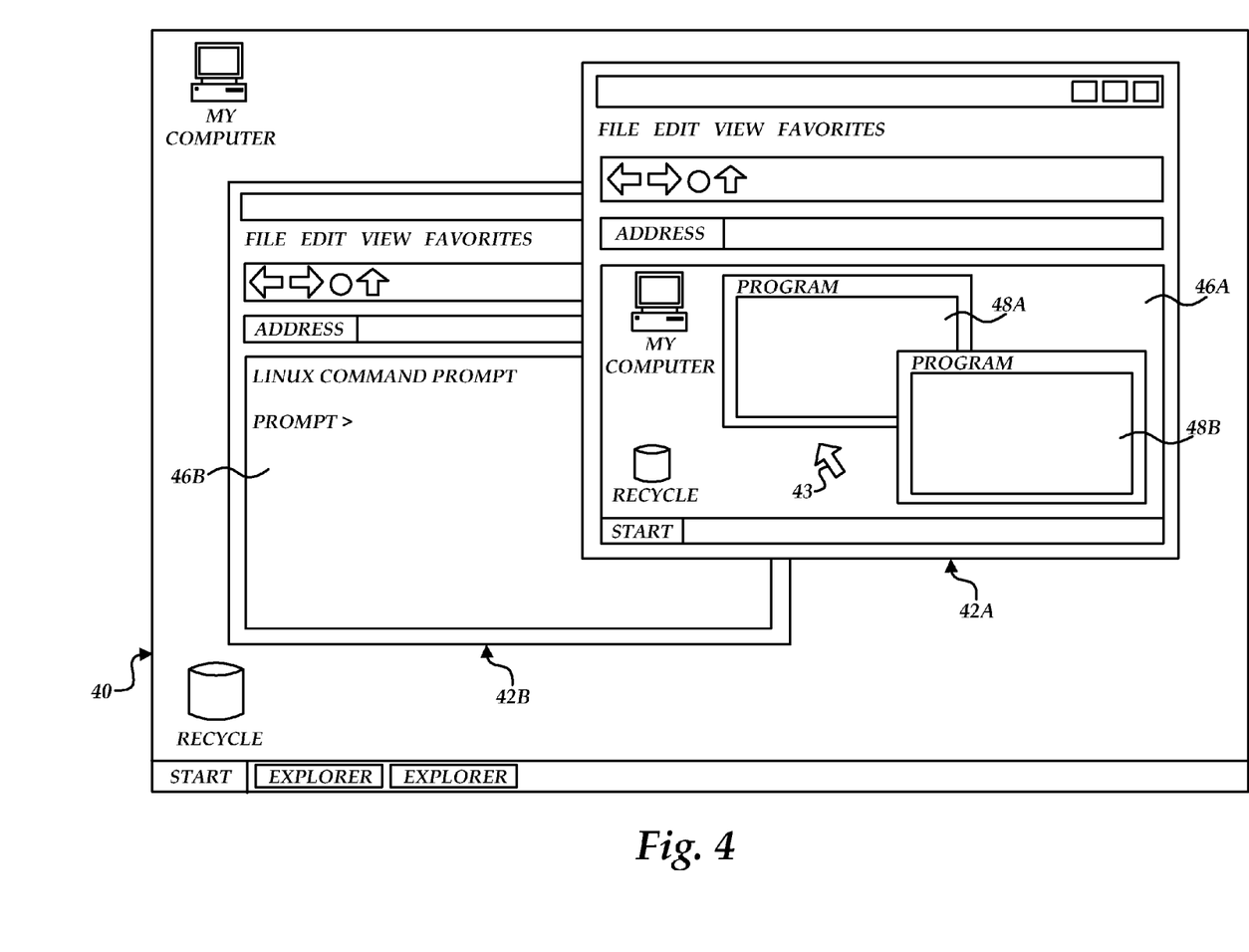
FIG. 4 shows a screen display produced by a computer system provided in one embodiment of the invention.

Turning now to FIG. 4, an illustrative screen display 40 provided by a local computer 2 will be described. The screen display 40 shows an illustrative screen display provided by a computer 2 executing the MICROSOFT WINDOWS XP operating system and communicating with two remote computers 4A and 4B. In particular, the screen display 40 shows a first user interface window 42A generated by the MICROSOFT INTERNET EXPLORER Web browser executing a plug-in 7 and connected to a remote computer 4A. The user interface window 42A includes the entire screen display generated by the remote computer 4A, including the user interface desktop 46A, a user interface window 48A generated by a computer program 8A executing on the remote computer 4A. As described above, the screen display shown in the window 42A is compressed by the redirection device 12A and transmitted to the local computer 2, where it is displayed. Additionally, the automated testing program 10 executing on the local computer 2 may generate user input commands in the window 42A. These commands are received by the plug-in 7 and transmitted to the redirection device 12A for execution on the remote computer 4A.

The user interface window 42B includes a screen display generated by the remote computer 4B. In particular, as shown in FIG. 4, the user interface window 42B includes a screen display generated by an operating system 32B executing on the remote computer 4B. It should be appreciated that more than three instances of the Web browser 6 and plug-in 7 may be utilized to simultaneously test software executing on any number of computers equipped with redirection devices. It should also be appreciated that the user interface windows 42A and 42B may be maximized to encompass the entire display screen. In this manner, the display shown at the local computer 2 would be identical to that generated one of the remote computers.

Figure 5:
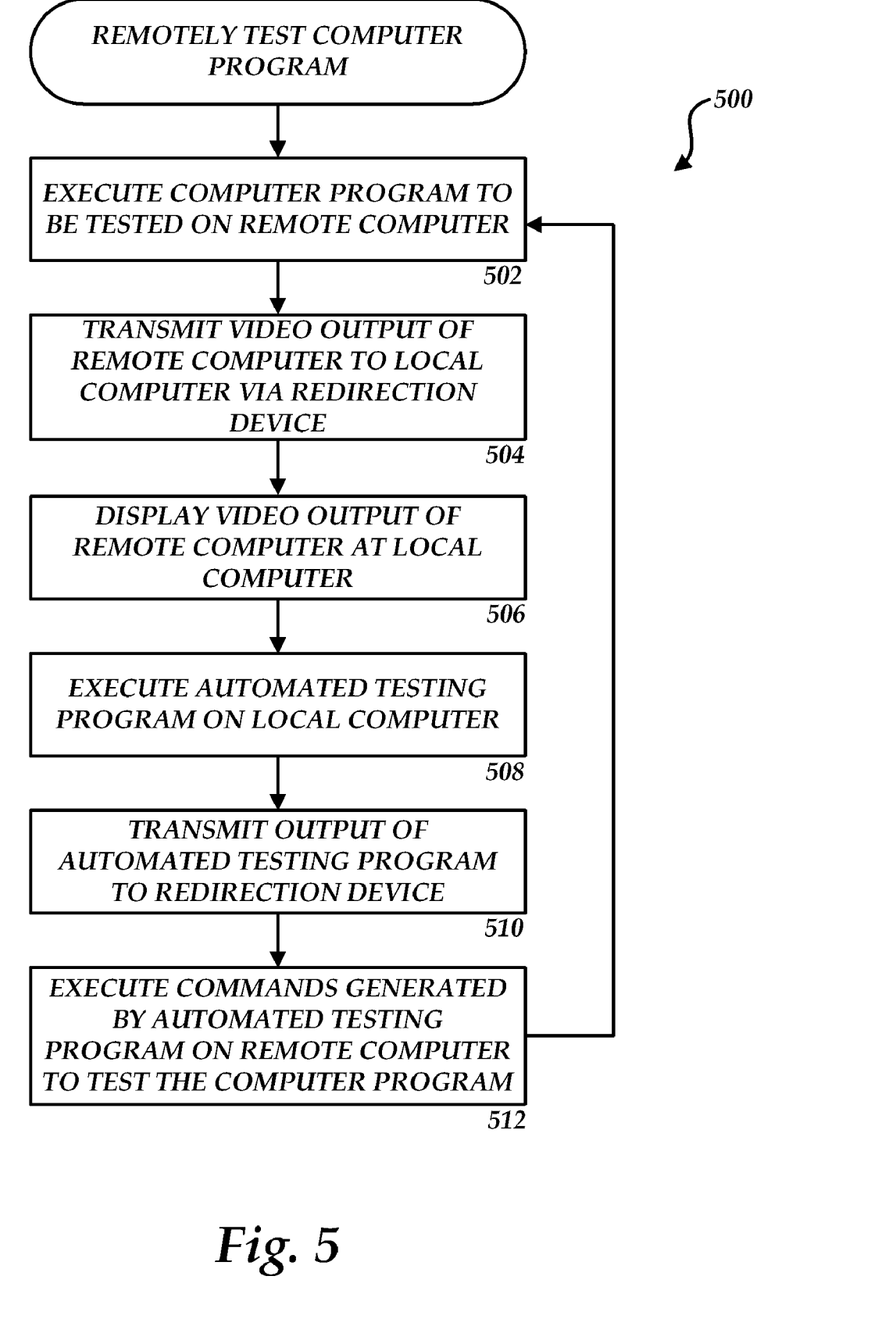
FIG. 5 illustrates an operational flow for remotely testing a computer program utilized in one embodiment of the invention.

Turning now to FIGS. 1 and 5, an illustrative routine 500 will be described for controlling the operation of the system for remotely testing a software program according to one embodiment of the invention. The routine 500 begins at block 502, where the remote computer 4 executes the computer program 8 to be tested. From block 502, the routine 500 continues to block 504, where the compressed video output of the remote computer 4 is transmitted to the plug-in 7 by the redirection device 12. At block 506, the plug-in 7 receives the compressed video output and displays the output on the local computer 2 in a window or full screen. It should be appreciated that the redirection device 12 and the plug-in 7 perform the transmitting and displaying functions, respectively, in a continual manner so that an updated video display is continually displayed at the local computer 2. Moreover, it should be appreciated that displaying the video output of the remote computer 4 at the local computer 2 is not necessary to test the computer program 8.

From block 506, the routine 500 continues to block 508, where the automated testing program 10 is executed at the local computer 2. User input commands generated by the automated testing program 10 based on the test scripts 11 are directed to the display of the remote computer 4. The commands generated by the automated testing program 10 are received by the plug-in 7 and are transmitted to the redirection device 12 at block 510. The commands may then be passed by the redirection device 12 to the remote computer 4 for execution at the remote computer 4 as if the commands were received at input devices physically connected to the remote computer 4. In particular, user input commands may be generated by the automated testing program 10 that are directed to screen displays generated by the computer program 8. The user interface commands may then be passed to the remote computer 4 and executed on the computer program 8 as if the commands were generated by a user located physically proximate to the remote computer 4 at block 512. In this manner, the automated testing program 10 may be utilized to test the execution of the computer program 8 from a remote location. From block 512, the routine 500 returns to block 502, where the above-described process repeats.

Based on the foregoing, it should be appreciated that the various embodiments of the invention provide methods and systems for remotely testing a software program. The above specification, examples and data provide a complete description of the manufacture and use of the composition of the invention. Since many embodiments of the invention can be made without departing from the spirit and scope of the invention, the invention resides in the claims hereinafter appended.

I claim:

1. A system for testing a computer program executing on a first computer from a second computer within a network, the system comprising:
 the first computer operative to execute the computer program, the first computer comprising an operating system independent video and input/output redirection device operative:
  to transmit the video output of the first computer to the second computer, the video output associated with the computer program,
  to receive user input commands transmitted from the second computer, and
  to provide the user input commands to the first computer as if the user input commands were physically generated at the first computer;
 the first computer further operative to execute the user input commands to control the computer program, wherein the user input commands test an interaction between the computer program executed by the first computer and a third computer connected to the network; and
 the second computer operative to execute a software application, the software application operative:
  to receive the video output of the first computer,
  to display the video output of the first computer,
  to receive the user input commands generated by an automated testing program executing on the second computer and directed toward the displayed video output of the first computer, wherein the user input commands test an interaction between the computer program executed by the first computer and the third computer, and
  to transmit the user input commands to the operating system independent video and input/output redirection device.

2. The system of claim 1, wherein the input/output redirection device is operative to transmit the video output of the first computer to the second computer as data capable of being displayed in a web browser application, and wherein the software application comprises the web browser application.

3. The system of claim 1, wherein the video output of the first computer includes a screen display generated by the computer program and wherein the user input commands generated by the automated testing program are directed toward the screen display.

4. The system of claim 1, wherein the first computer and the second computer are physically located at two different locations and wherein the first computer and the second computer are connected via a communications network.

5. The system of claim 1, wherein the computer program executing on the first computer comprises an operating system program.

6. The system of claim 1, wherein the computer program executing on the first computer comprises a basic input/output system program.

7. The system of claim 1, wherein the computer program executing on the first computer comprises an application program.

8. The system of claim 1, wherein the third computer is operative to provide a storage volume and wherein the computer program is operative to access data stored in the storage volume.

9. A method for testing computer programs executing on a plurality of remote computers from a local computer within a network, the method comprising:
 executing the computer programs to be tested on the plurality of remote computers;
 transmitting, via operating system independent video and input/output redirection devices associated with the plurality of remote computers, video output of each of the plurality of remote computers to the local computer, the video output including a screen display generated by each of the computer programs;
 displaying the video output of each of the plurality of remote computers at the local computer, the video output of each of the plurality of remote computers simultaneously displayed in a separate user interface window at the local computer;
 receiving user input commands at the local computer, the user input commands generated by an automated testing program and directed toward the screen display generated by the computer program programs executing on the plurality of remote computers;
 transmitting the user input commands to the plurality of remote computers; and
 executing the user input commands at the plurality of remote computers to test the computer program programs as if the user input commands were physically generated at the plurality of remote computers.

10. The method of claim 9, wherein transmitting the video output of the plurality of remote computers to the local computer comprises transmitting the video output of the plurality of remote computers to the local computer in a format displayable within a web browser application, and wherein displaying the video output of the plurality of remote computers at the local computer comprises displaying the video output of the plurality of remote computers at the local computer within a web browser application.

11. The method of claim 9, wherein the plurality of remote computers and the local computer are physically located at different locations and wherein the plurality of remote computers and the local computer are connected via a communications network.

12. The method of claim 9, wherein the computer programs executing on the plurality of remote computers comprise operating system programs.

13. The method of claim 9, wherein the computer programs executing on the plurality of remote computers comprise basic input/output system programs.

14. The method of claim 9, wherein the computer programs executing on the plurality of remote computers comprise application programs.

15. The method of claim 9, wherein the computer programs are operative to access data stored on a storage volume provided by a server computer, and wherein the user input commands generated by the automated testing program cause the computer programs to access the data stored on the storage volume to test an interaction between the plurality of remote computers and the server computer.

16. A computer-controlled apparatus capable of performing the method of claim 9.

17. A computer storage media comprising computer executable instructions which, when executed by a computer, cause the computer to perform the method of claim 9.

\* \* \* \* \*

UNITED STATES PATENT AND TRADEMARK OFFICE
CERTIFICATE OF CORRECTION

PATENT NO. : 7,546,584 B2
APPLICATION NO. : 10/462509
DATED : June 9, 2009
INVENTOR(S) : Gene Rovang It is certified that error appears in the above-identified patent and that said Letters Patent is hereby corrected as shown below:

Claim 1, at column 9, lines 26-60. At column 9, line 32, delete "the" before "video" on line 32. Corrected claim 1 should read as follows:

1. A system for testing a computer program executing on a first computer from a second computer within a network, the system comprising:

the first computer operative to execute the computer program, the first computer comprising an operating system independent video and input/output redirection device operative:

to transmit video output of the first computer to the second computer, the video output associated with the computer program, to receive user input commands transmitted from the second computer, and to provide the user input commands to the first computer as if the user input commands were physically generated at the first computer;

the first computer further operative to execute the user input commands to control the computer program, wherein the user input commands test an interaction between the computer program executed by the first computer and a third computer connected to the network; and the second computer operative to execute a software application, the software application operative:

to receive the video output of the first computer, to display the video output of the first computer, Signed and Sealed this Second Day of November, 2010

David J. Kappos
*Director of the United States Patent and Trademark Office* to receive the user input commands generated by an automated testing program executing on the second computer and directed toward the displayed video output of the first computer, wherein the user input commands test an interaction between the computer program executed by the first computer and the third computer, and to transmit the user input commands to the operating system independent video and input/output redirection device.